United States Patent [11] 3,610,767

[72] Inventor Helmut Nutt
       Areuse, Neuchatel, Switzerland
[21] Appl. No. 794,003
[22] Filed Jan. 27, 1969
[45] Patented Oct. 5, 1971
[73] Assignee Mikron-Haesler S.A.
       Boudry/Neuchatel, Switzerland
[32] Priority Feb. 6, 1968
[33] Switzerland
[31] 1809/68

[54] TAPPING MACHINE
     3 Claims, 3 Drawing Figs.
[52] U.S. Cl. .................................... 408/137,
                    10/139, 408/138, 408/241
[51] Int. Cl. ...................................... B23g 1/00,
                                                 B23b 47/18
[50] Field of Search .......................... 10/1, 139;
            74/89.14, 89.15, 424.8; 77/34.4, 34.7; 408/137,
                                                 138, 241

[56] References Cited
           UNITED STATES PATENTS
    640,281   1/1900  Dowding ................... 10/139
  2,233,915   3/1941  Conrad ....................... 74/424.8
  2,501,298   3/1950  Winchell ..................... 74/424.8
  2,637,052   5/1953  Woock ....................... 10/139
  2,768,393  10/1956  Sayce ......................... 10/1
  3,105,397  10/1963  Hayden ...................... 77/34.7
  3,178,740   4/1965  Dorak ......................... 77/34.4
  3,404,582  10/1968  Sodergard et al. ............. 74/89.15
  3,389,413   6/1968  Van Den Kieboom ....... 10/139

Primary Examiner—Charles W. Lanham
Assistant Examiner—E. M. Combs
Attorney—Young & Thompson ABSTRACT: This invention relates to a tapping machine including a rotating spindle capable of moving axially with a reciprocating motion for driving one of several taps, this spindle including on part of its length one or several guiding screw threads with a pitch corresponding to the one of the taps, while one of several fixed skids is resiliently applied against the guiding screw threads for driving the spindle axially, means to hold the spindle in its operating position and to reverse the direction of rotation of the spindle being also provided.

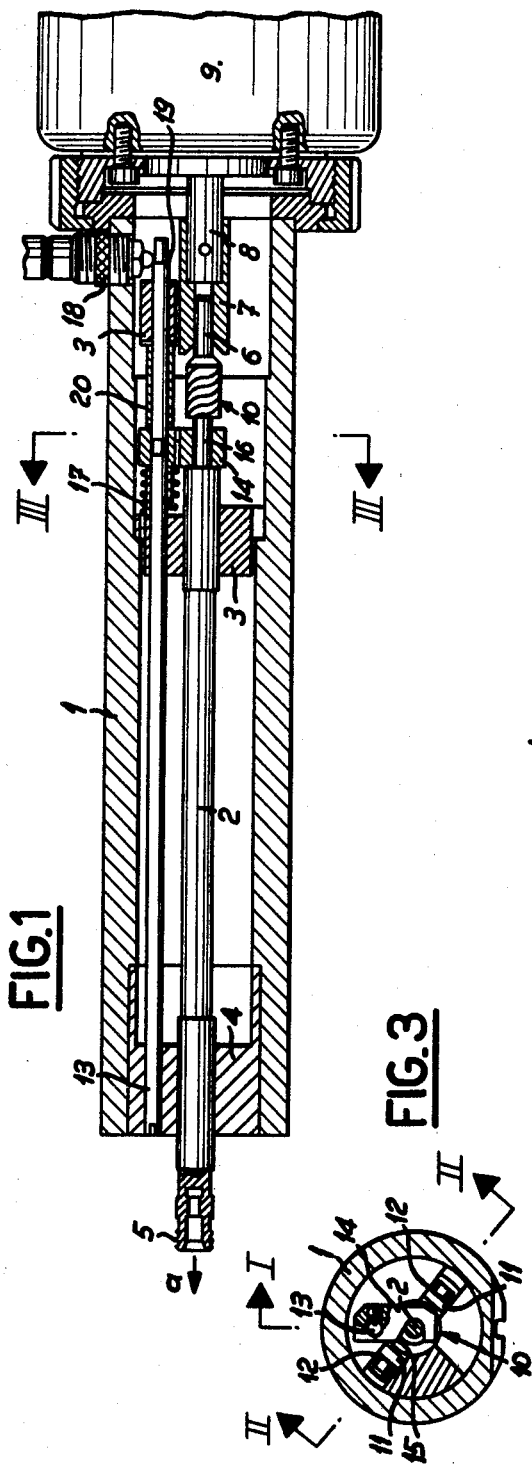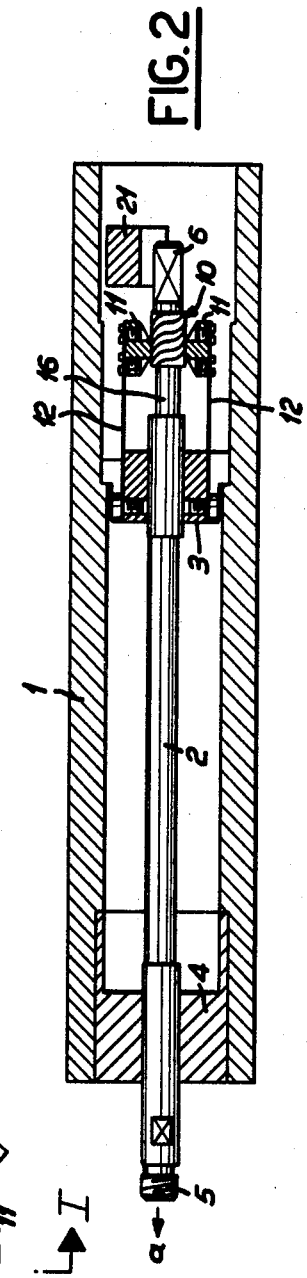

TAPPING MACHINE

The present invention relates to a tapping machine including a rotating spindle capable of moving axially with a reciprocating motion for driving at least one tap.

A principal object of the invention is to provide a tapping machine with a spindle including on part of its length at least equal to the amplitude of its reciprocating axial movement at least one guiding screw thread the pitch of which corresponds exactly to that of the tap, while at least one axially fixed skid is resiliently applied against this guiding screw thread. The novel features which are believed to be characteristic of the invention will be better understood from the following description considered in connection with the accompanying drawing in which an embodiment of the invention is shown by way of example.

FIG. 1 is a longitudinal section of the tapping machine according to the invention along the lend I—I of FIG. 3.

FIG. 2 is a longitudinal section of the machine along the line II—II of FIG. 3.

FIG. 3 is a partial cross section of the machine along the line III—III of FIG. 1.

The tapping machine shown includes a sleeve 1 inside which a spindle 2 is guide for axial reciprocation and rotation relative to sleeve 1 by supporting means 3 and 4 which include bearings for this spindle 2.

One end of this spindle is provided with a tap 5 protruding outside sleeve 1 for cutting a tapping in a work piece.

The other end of the spindle includes a part 6 (male in the illustrate example) of coupling means of which the other part 7 (female in this example) is integral with the driving shaft 8 of the rotating spindle. The driving shaft 8 may be, as illustrated, the shaft of an asynchronous electrical motor 9 or a shaft which is rotated by any other known means e.g. a pinion gearing, a pulley etc.

The coupling 6, 7 of the spindle with its driving shaft 8 during rotation is such that the spindle becomes integral with this shaft 8 for all angular movement of the shaft while it can still freely perform axial movements with respect to this shaft 8. In the example shown, this coupling is actually a screwdriver coupling.

The tapping machine includes means for displacement of spindle 2 in the axial direction. This axial displacement means include on the outer surface of the spindle and on part of its length at least equal to the amplitude of the reciprocal axial displacement of this spindle a guiding screw thread 10, the pitch of which corresponds exactly to the pitch of tap 5 on the end of spindle 2.

The shape of the threads of the guiding screw thread 10 may vary and can for example be identical to the shape of the threads of the tap when cutting screw threads with a narrow pitch or on the contrary present a different shape of screw thread. The important feature is that the pitch of the guiding screw thread 10 is identical with that of tap 5 and that on the other hand its projection on part of the outer surface of the spindle has a sufficiently sharp edge. This guiding screw thread is directly tooled on the outer surface of the spindle so that it has sufficient hardness.

The means for axial movement of spindle 2 include further at least one, two in the example shown, skids 11 resiliently applied against the guiding screw thread 10.

As shown in FIG. 2, these skids 11 are each borne by the free end of a spring leaf 12, the other end of which is rigidly secured to supporting means 3 and therefore to sleeve 1.

These skids 11 which are diametrically located with respect to spindle 2 have a friction surface maintained in contact, by means of spring leaves 12, with the guiding screw thread 10. These skids 11 are preferably made of a material softer than the guiding screw thread, such as bronze or a synthetic material such as nylon or "Ultramid."

It should be noted that when these skids 11 are new their friction surface is flat without any other forming. During the rotation of the spindle 2, the relatively soft material of skids 11 will be self-threading against screw thread 10; and thereafter, the threads on 10 and 11 will coact so that upon rotation, spindle 2 is axially displaced in the direction of arrow a. The axial displacement of the spindle during each rotation corresponds exactly to the pitch of the tap 5, the guiding screw thread 10 having the same pitch as this tap, which corresponds to the required conditions for cutting the tapping. When reversing the direction of rotation of spindle 2, either by means of a mechanical reverser or by reversing the direction of rotation of motor 9 for example, an axial displacement of the spindle of an identical amplitude per revolution but in the other direction is achieved, which permits extracting the tap 5 from the tapping which has just been cut.

It is evident that skids 11 will wear, but practical tests have shown that this wear, which is rather fast in the beginning, during the first hours of use, becomes practically negligible, once this initial wear has produced grooves in the friction surface of skids 11 which then come in close contact with spindle 2. It is also evident that either the fast initial wear or the negligible subsequent wear depend on various parameters, the most important being the choice of the material for skids 11, the difference in hardness between the material of spindle 2 and of skids 11, the speed of rotation of spindle 2, the force with which each skid 11 is applied against the external surface of spindle 2 provided with the guiding screw thread 10, and possibly also the resistance to actual displacement of spindle 2 during the tapping operation.

However, hardness trials during several weeks, where a spindle has been continuously rotated and periodically reversed 24 hours a day, proved that, except for the initial wear which takes place during the first hour, the subsequent wear is negligible and cannot even be noticed in some cases.

Depending on the power required to ensure the progression of tap 5 during machining, power which depends on the diameter of the tapping and its pitch, the force with which the skids 11 have to be applied to the guiding screw thread has to be modified. For instance, depending on the diameter and the pitch of the tapping which has to be produced by a given tapping machine, the elastic application force of skids 11 supplied by spring leaves 12 may vary for example between one-half pound and 20 pounds or more.

For machining tappings of larger dimensions, diameter and pitch, one may use different means for the resilient application of skids 11 than the above mentioned spring leaves. Alternatively, skids 11 may be pressed against spindle 2 by means of coil springs or other resilient means such as shoulders made of resilient material, provided inside sleeve 1.

Alternatively also the number of skids may be increased e.g. 3, 4 or more. These skids may be positioned at an angle to each other and also set off axially provided that the length of the part of spindle 2 bearing the guiding screw thread is increased accordingly or that several parts of the spindle are provided with a guiding screw thread of identical pitch.

With regard to the number and the positioning of skids 11, it should be noted that this can vary from case to case and must be selected according to the intended use of the tapping machine, that is with regard to the type and dimension of the tapping which is to be produced. It is also possible for tappings with a relatively large pitch to provide several guiding screw threads, as in the case of a screw thread with several threads.

Spindle 2 is removable so that the tapping machine may be equipped with a set of different spindles, related each to a special tapping within a series of those feasible, and the change from one spindle to another takes place without any modification of the tapping machine, other than replacing the spindle under consideration or its part 10.

Actual trials have shown that even after the initial wear of skids 11 has taken place, those may be applied on a spindle having a different guiding screw thread 10, the pitch of which is different, without affecting the action of the axial advance means of the spindle.

In case of axial blocking of spindle 2, which may happen when the feed of the tapping has not been correctly adjusted, when a workpiece is not properly positioned with respect to the spindle, when the spindle used does not correspond to the workpiece to be machined or when the electric control of the apparatus or machine tool on which it is used breaks down, the tapping machine is not damaged.

In case the axial displacement of the spindle is prevented, skids 11 may be lifted against the spring load and will no longer be geared with the guiding screw thread which will then slip along the friction surface of skids 11.

Obviously, if such an axial blocking of spindle 2 is of extended duration, the friction surface of skids 11 will be flattened, but this is of no importance since, as soon as the said blocking of the spindle ceases, the guiding screw thread bites against spindle 2 the skids and, as a result, the axial drive of the spindle is resumed.

The tapping machine as illustrated includes further means to hold spindle 2 in its operating position and means to reverse the direction of rotation and to produce the axial displacement of the spindle 2.

The means for holding the spindle 2 in its working position include a shaft 13 guided axially and rotatable in supports 3, 4, extending inside sleeve 1 parallel to spindle 2.

This shaft 13 is provided at its end which is accessible from the forward end of the tapping machine with a screw driver notch while at its other end a lever 14 with a notch 15 is provided to accommodate in its operational position a thinned portion 16 of spindle 2. This portion of reduced diameter 16 has a length equal to the axial feed of spindle 2 plus the thickness of lever 14 and is defined between two shoulders.

This arrangement permits, therefore, in the position shown on the drawing, maintaining spindle 2 in its working position in the tapping machine. To withdraw spindle 2, shaft 13 is rotated a quarter turn by means of a screwdriver inserted in the notch, which results in a displacement of lever 14 and the unlocking of spindle 2 which may be withdrawn from the machine by pulling its end provided with tap 5.

Spring 17 tends to maintain shaft 13 in its position where it locks the spindle in its working position. This spring 17 is a helical torsion spring, one end of which is attached to support 3 while the other end is secured to lever 14.

Finally, the means for reversing the direction of rotation of spindle 2 are conventional. In the example shown this reversal of the direction of rotation of spindle 2 is produced by reversal of the direction of rotation of motor 9 by means of a microinterrupter 18.

This microinterrupter 18 is fixed in sleeve 1 and its control means cooperate with the free end of shaft 13 which is provided with a shoulder 19. One of the axial positions of shaft 13 is determined by the pressure of spring 17 on lever 14, the movement of which is limited by sleeve 20, surrounding shaft 13 and located between lever 14 and the fixed support 3 secured to sleeve 1.

In this position, shown in FIG. 1, shoulder 19 is positioned in such a way that the control means of the microinterrupter 18 are in contact with the thicker part of shaft 13 thus selecting by means of a conventional electrical control, which will not be described, the direction of rotation of motor 9 and thus of spindle 2 so that it will be shifted axially in the direction of arrow $a$.

When spindle 2 is moving forwards it slides in lever 14 until its shoulder corresponding to the end of part 16 of spindle 2 hits lever 14 and induces the axial displacement of shaft 13 and frees the control means of microinterrupter 18, which in turn produces a reversal of the direction of rotation of motor 9 and thus of the spindle.

The strength of spring 17 being in sufficient for displacing shaft 13 axially, it remains in this new position until it is displaced again by spindle 2 which carries the lever 14 in the reverse direction, which produces again a reversal of the direction of rotation of the spindle.

As an alternative, sleeve 1 may be replaced or constituted by the frame of a machine or else form the spindle of a tooling machine. It is apparent that this tapping machine may be either independent or constitute an accessory of a tooling machine or a transfer machine.

Alternatively, the tapping machine may be provided with several taps bearing spindles. To this effect spindle 2 drives a gearing meshing with other gearings each of which is integral with another one of such tap bearing spindles.

In other alternative constructions the axial drive of spindle 2 including skids 11 and the guiding screw thread 10 may be located outside the sleeve 1. In such case the skids 11 could be attached to a frame and no longer to sleeve 1 the latter following spindle 2 in its axial movements.

I claim:

1. A tapping machine comprising a spindle, means mounting the spindle in the machine for rotation and reciprocating axial movement, the spindle having at least one tap thereon, the spindle also having along a part of its length at least equal to the amplitude of its reciprocating axial movement at least one guiding screw thread the pitch of which corresponds to the pitch of the tap, at least one skid fixed axially of the spindle against axial movement with the spindle, said at least one skid being of a material softer than the material of said screw thread and having an unthreaded surface in contact with said screw thread, means resiliently urging said at least one skid against said screw thread so that upon rotation of said screw thread said screw thread will form threads in said at least one skid, a lever having a notch therein that receives a portion of said spindle of reduced diameter, and means mounting said lever for swinging movement relative to said spindle about an axis spaced from but parallel to the axis of said spindle, between one position in which said portion of said spindle of reduced diameter is disposed in said notch and another position in which said portion is out of said notch, said spindle being slidably withdrawable from the machine when said portion is out of said notch.

2. A tapping machine as claimed in claim 1, said spindle having said tap at one end and at the other end a connection for driving said spindle in rotation, said connection comprising a noncircular coupling the parts of which are engageable with and disengageable from each other by axial sliding movement of said spindle, and means mounting said spindle for axial sliding withdrawal from said machine in the direction of said tap.

3. A tapping machine as claimed in claim 1, said resilient means comprising leaf spring means.